Dec. 2, 1924.

A. VAN RONZELEN

NONSKID CHAIN

Filed Jan. 9, 1922

1,517,875

Inventor
Arthur Van Ronzelen
By F. P. Cornwall Atty.

Patented Dec. 2, 1924.

1,517,875

UNITED STATES PATENT OFFICE.

ARTHUR VAN RONZELEN, OF ST. LOUIS, MISSOURI, ASSIGNOR, BY DIRECT AND MESNE ASSIGNMENTS, TO UNIVERSAL SKID-LESS CHAIN COMPANY, OF NILES, MICHIGAN, A CORPORATION OF DELAWARE.

NONSKID CHAIN.

Application filed January 9, 1922. Serial No. 528,045.

*To all whom it may concern:*

Be it known that I, ARTHUR VAN RONZELEN, a citizen of the United States, residing at St. Louis, Missouri, have invented a certain new and useful Improvement in Nonskid Chains, of which the following is a full, clear, and exact description, such as will enable others skilled in the art to which it appertains to make and use the same, reference being had to the accompanying drawings, forming part of this application, in which—

Figure 1:
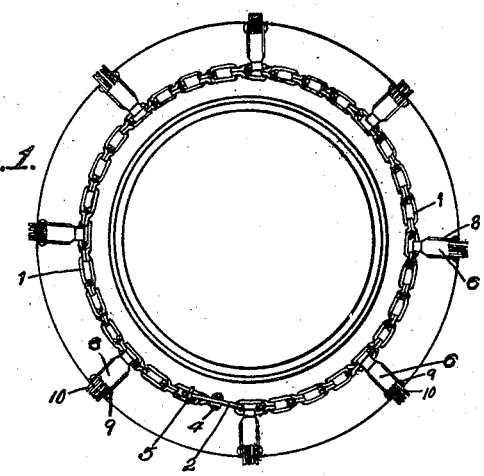
Figure 1 is a side elevational view of an automobile tire equipped with my improved non-skid chain.

This invention relates to a new and useful improvement in non-skid chains for inflated tires such as commonly used on automobiles, the object being to construct a chain whose cross lengths are made up of stamped or pressed metal parts identical in form and construction and which, when assembled on a tire and bent on a curved line, will give a bearing of spaced pyramidal points which will grip or bite into the surface of the road or mud, as the case may be, and enable the wheel to exert its driving power, and at the same time hold the wheel against slipping or skidding.

In the drawings, 1 indicates the links of the side chains, the inner terminus of each of which is formed with a hook-like extension 2 for co-operating with the loop 3 connected to the opposite end of a chain. This hook-like extension is pivotally mounted on a rivet or bolt 4, and its free end co-operates with a V-shaped locking member 5 slidingly mounted on one of the links of chain 1. When the loop 3 engages the hook, it tends to move the same on its pivot 4, and this opening movement is resisted by the V-shaped member 5 and any tendency of the V-shaped member to creep along the link of chain 1 places its engagement closer to the pivotal point of hook 2 until arrested.

Figure 2:
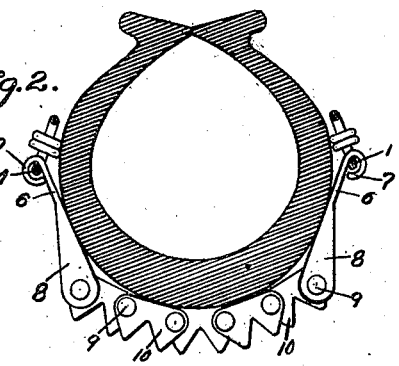
Figure 2 is an enlarged cross-sectional view showing an inflated tire equipped with my chain.
Figure 3:
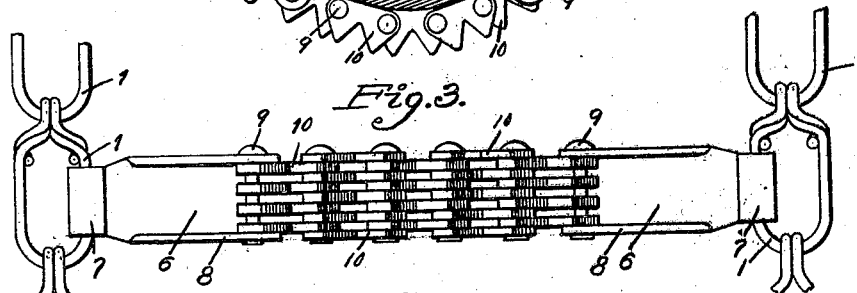
Figure 3 is a top plan view of one of the cross chains.

The cross chain includes two side links 6 made of pressed metal and having eyes 7 at their outer ends which engage with the links of the chain 1. It is obvious that these cross chains could be secured by straps or bands which encircle the tire. Side links 6 have upwardly extending flanges 8 which provide mounts for rivets 9, on which rivets are pivotally mounted a cross chain each link of which consists of a series of identical elements 10. These elements 10, which constitute the cross chain, are pivotally connected at their ends, the elements of one link being spaced apart by the adjacent link elements, each end being provided with an outwardly extending pointed projection so that when said links are curved over the tire, as shown in Figure 2, they will be separated or spread apart, thus offering biting teeth to engage the surface over which the tire is run.

Figure 4:
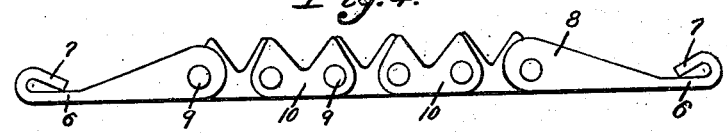
Figure 4 is a side elevational view of said cross chain.
Figure 6:
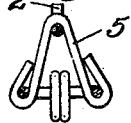
Figure 6 is a sectional view on line 6—6 of Figure 5.
Figure 5:
Figure 5 is a side elevational view of an improved form of fastening device for the side chains.

All of the elements 10 constituting the cross chain are made from the same die, and being identical in form, have the apices of their ends in substantially alinement when the cross chain is straightened, as shown in Figure 4. These apices are spread apart when the chain is curved as shown in Figure 2. This spreading apart destroys the alinement of the teeth and breaks up the "ridge" of teeth extending across the chain, substituting therefor a plurality of spaced points which serve much more effectively to prevent skidding than the runner-like formation of the alined teeth.

These cross chains are really short lengths of the drive chains of inverted tooth style commonly known as "silent chains" and are produced in large quantities by a number of manufacturers. They are usually of harder material than the link chains in common use and may be stamped instead of being bent. The hard points well adapt the links for engaging the ground and the straight flush backs of the links abreast of each other present a highly desirable smooth contacting surface for the tire.

It will be apparent from the foregoing that by my novel construction, and collocation of thin, flat links, I provide a flexible band of substantial width having numerous thin outer road engaging points, which grip the road surface and prevent side skidding, wherein the pivots pass through adjacent ends of contiguous links and are positioned directly inwardly of said outer road engaging points. This provides a durable and effective structure and in conjunction with the side links or plates 6, prevents said flexible band from shifting or tipping when in use, as is evident.

What I claim is:

In an anti-skid device, having a cross chain comprising a plurality of thin, flat links all of one standard uniform dimension and each being provided with two outer, terminal, sharp road engaging points with a recess therebetween and pivots passing transversely through adjacent ends of contiguous links and directly inwardly of the road engaging points, thus providing a flexible band of substantial width having numerous thin, road engaging projections the combination of a plate at each end of said flexible band, of substantially the same width as said band, and provided with a relatively wide side chain link engaging member, and further provided with a flange at each edge thereof, the outer edges of said flanges being in continuation of said points and merging into said plate adjacent to said link engaging members.

In testimony whereof I hereunto affix my signature this 5th day of January, 1922.

ARTHUR VAN RONZELEN.